United States Patent [19]

Schlecht

[11] 4,084,423
[45] Apr. 18, 1978

[54] METHOD FOR FORMING A TRACK LINK BUSHING HAVING A CONTOURED OPENING

[75] Inventor: Charles H. Schlecht, York, Pa.

[73] Assignee: Caterpillar Tractor Co., Peoria, Ill.

[21] Appl. No.: 682,813

[22] Filed: May 3, 1976

[51] Int. Cl.² .............. B21C 25/04; B21C 25/08; B21D 45/08

[52] U.S. Cl. .................... 72/256; 72/260; 72/264; 72/344; 72/377

[58] Field of Search .............. 72/260, 264, 266, 276, 72/283, 284, 343, 347, 348, 349, 356, 377, 344, 256; 29/149.5 C, 149.5 DP

[56] References Cited

U.S. PATENT DOCUMENTS

| | | | |
|---|---|---|---|
| 2,228,301 | 1/1941 | Ditzel et al. | 72/283 |
| 2,258,242 | 10/1941 | Ditzel et al. | 72/276 |
| 2,392,175 | 1/1944 | Norton | 72/260 |
| 2,548,702 | 4/1951 | Chamberlain | 72/343 |
| 2,932,889 | 4/1960 | Kritscher | 72/343 |
| 2,942,728 | 6/1960 | Hilton | 72/260 |
| 3,165,199 | 1/1965 | Tlaker | 72/343 |
| 3,176,494 | 4/1965 | Cullen et al. | 72/260 |
| 3,314,266 | 4/1967 | Werther et al. | 72/377 |

FOREIGN PATENT DOCUMENTS

| | | | |
|---|---|---|---|
| 873,534 | 4/1953 | Germany | 72/349 |
| 579,625 | 7/1958 | Italy | 72/347 |

Primary Examiner—C.W. Lanham
Assistant Examiner—D. M. Gurley
Attorney, Agent, or Firm—Frank L. Hart

[57] ABSTRACT

A method for extruding a track link bushing having a contoured opening and a generally cylindrical outer surface.

10 Claims, 3 Drawing Figures

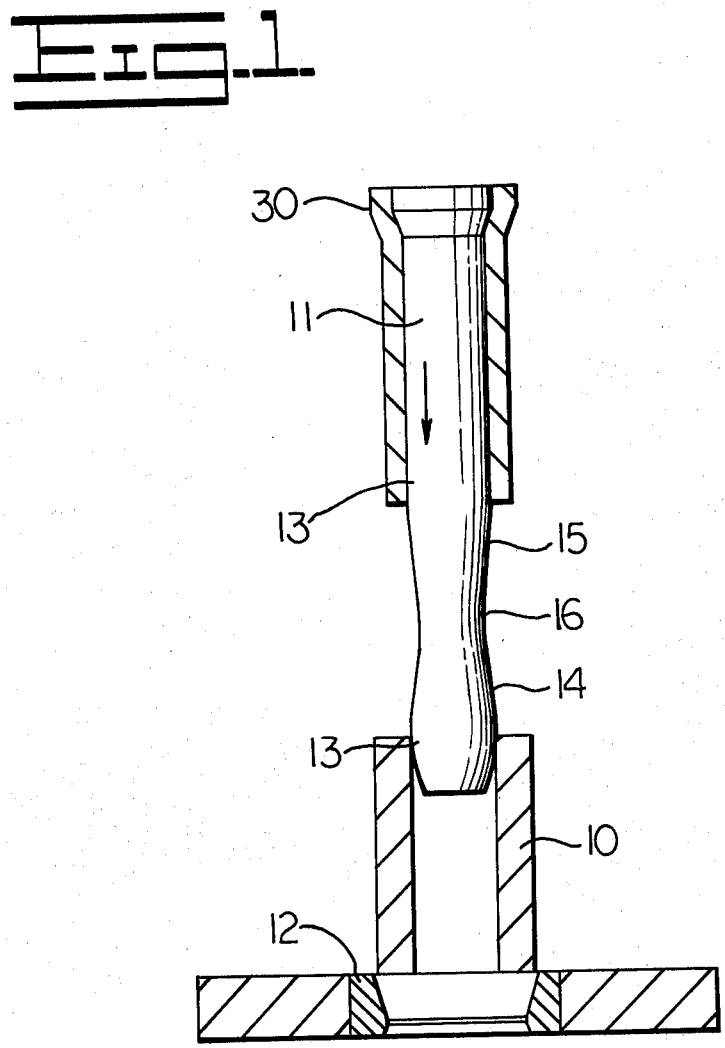

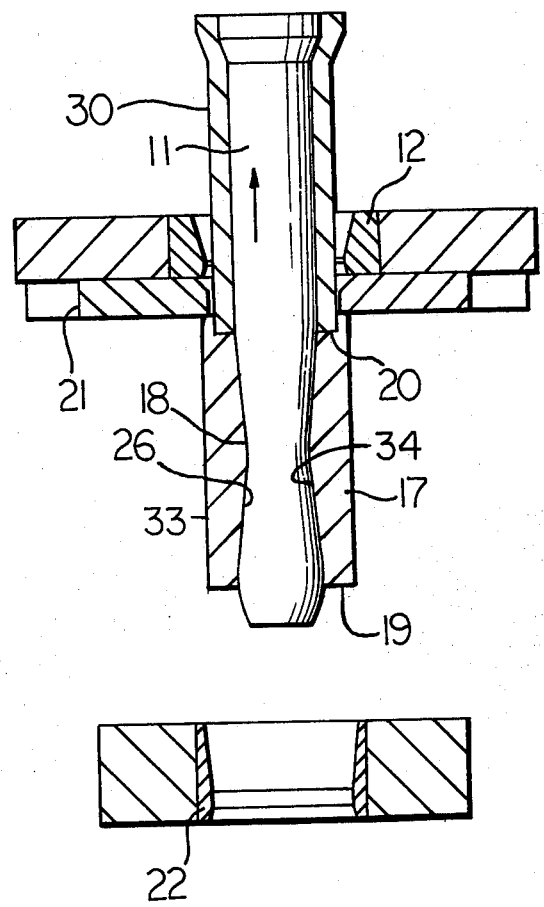

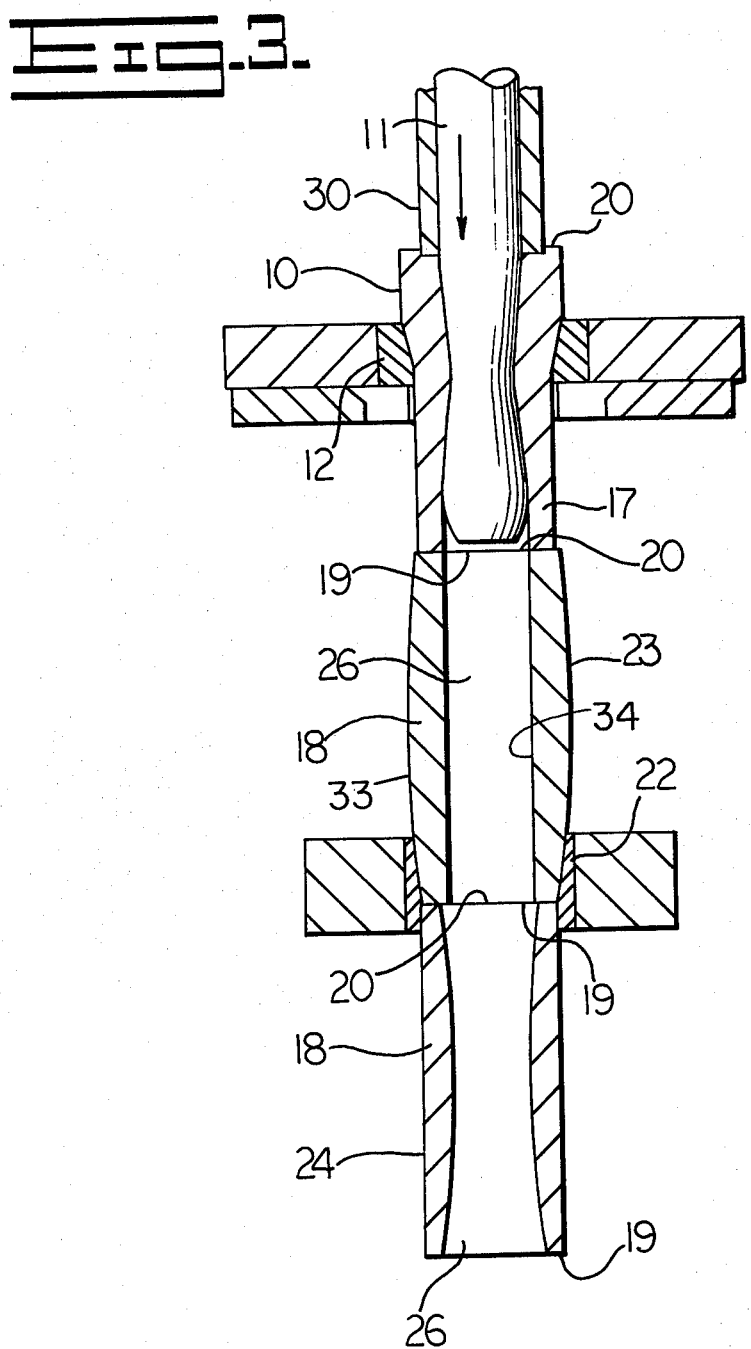

METHOD FOR FORMING A TRACK LINK BUSHING HAVING A CONTOURED OPENING

BACKGROUND OF THE INVENTION

In the use of track link bushings, it was discovered that the life of the bushing could be markedly increased by tapering or contouring the end portions of the bushing openings to compensate for track link pin deflection under loaded conditions. The heretofore utilized methods of forming these double tapered bushings was by cutting or grinding the inner walls which required an undesirable amount of labor and time.

This invention, therefore, resides in a method for forming a track link bushing by extrusion.

BRIEF DESCRIPTION OF THE DRAWINGS

FIG. 1 is a diagrammatic view in partial section showing the mandrel, first ring die and metal slug for forming the metal blank;

FIG. 2 is a diagrammatic view in partial section showing the metal blank at the initiation of stripping of the mandrel therefrom;

FIG. 3 is a diagrammatic view in partial section showing the mandrel forming a third metal blank, a second metal blank having the mandrel removed and the bushing resulting from passing the first blank through the second ring die.

DETAILED DESCRIPTION OF THE INVENTION

Referring to FIG. 1, a metal slug 10 of preselected configuration is positioned between a mandrel 11 and a first ring die 12 which sizes the outer surface of a tubular metal blank from the slug 10. The mandrel 11 has an enlarged end 13 and a contoured double tapered or curved 14,15 middle portion 16.

Referring to FIG. 2, the mandrel 11 is urged against the metal slug 10 and through the first ring die 12 for extruding the metal slug 10 and forming a tubular metal blank 17 about the mandrel 11.

During forming of the metal blank 17, metal flows about and along the outer surface of the mandrel 11 in the annulus between the mandrel 11 and the ring die 12. The configuration of the inner surface of the blank 17 is of the form of the middle portion 16 of the mandrel 11 which is of a preselected configuration. This configuration curves or tapers from a middle portion 18 of the blank outwardly toward the opposed ends 19,20 of the blank 17. The outer surface of the blank 17 is of a generally cylindrical configuration. The metal slug 10 is contacted by a ledge portion 30 of the mandrel 11 for forming the second end 20 of the blank 17.

Holding mean 21 or fingers positioned on the downstream side of the first ring die 12 move inwardly into contact with the second end 20 of the blank 17 for maintaining the blank 17 and the mandrel 11 is thereafter moved through and from the blank 17. After removal of the mandrel 11, the elements 21 are retracted.

Referring to FIGS. 2 and 3, as the mandrel 11 is passed through the blank 17, the enlarged end portion 13 moves the walls and inside diameter outwardly, forms a generally cylindrical inside opening or surface 34, moves the outer walls or surface 33 of the blank 17 outwardly, and forms tapered blank outer surfaces of a preselected configuration, as shown by blank 23 of FIG. 3. This configuration curves or tapers from a middle portion 18 of the blank 13 inwardly toward opposed ends 19,20 of the blank 23.

Referring to FIG. 3, the second blank 23 is thereafter passed through a second ring die 22 for decreasing the outside diameter of the blank 23, forming a generally cylindrical outer surface, moving the inner walls 34 of the blank 23 inwardly, and forming a third blank 24 having a blank opening 26 curving or tapering outwardly from the middle portion 18 of the blank 24 toward each end 19,20 of the blank 24.

Each blank is preferably pushed through the second ring die 22 with a subsequently formed blank. Other elements, such as a push rod (not shown), can be used but the resultant production rate would be reduced by the additional steps of utilizing the other element. Also, by using a subsequently formed blank to contact the second end 20 of a previously formed blank and move said previously formed blank through the second ring die 22, the operation can be generally continuous.

If desired, the metal slug can be heated to a preselected temperature prior to forming the blank.

As is known in the metal extrusion art, the dimensions of the mandrel 11, ring dies 12,22 and the dimensions and configuration of the slug 10 are dependent upon the final dimensions of the resultant bushing 24. After the exact dimensions of the resultant bushing have been determined, one skilled in the art can readily determine the variables.

On example track pin pushing that has proven to have increased wear properties is as follows:
  Length; 16 cm (6.28 in.)
  O.D.; 8.8 cm (3.81 in.)
  I.D. at ends (19,20); 5,791 cm (2.28 in.)
  I.D. at middle portion (18); 5.766 cm (2.27 in.)
This bushing was formd with apparatus as follows:
  Slug (10); Alloy Steel, Carburizing Grade
  Configuration; Cylindrical
  Volume; 1065 cm$^3$
  Mandrel (11); Double Linear Tapered
  Length; 45.7 cm (18 in.)
  Diameter, end (13); 5.817 cm (2.29 in.)
  Diameter, middle (16); 5.766 cm (2.27 in.)
  First Ring Die (12)
    Diameter; 9.67 cm (3.807 in.)
  Second Ring Die (22)
    Diameter; 9.52 cm (3.800 in.)

Other aspects, objects, and advantages will become apparent from a study of the drawings, specification, and claims.

What is claimed is:

1. A method for forming a track pin bushing having a contoured opening and a generally cylindrical outer surface, comprising:
   Step 1: Positioning a metal slug between a mandrel and a first ring die, said mandrel having an enlarged end portion and a double contoured middle portion;
   Step 2: Urging the mandrel against the metal slug and through the first ring die for extruding the metal slug and forming a first metal blank having first and second ends and a generally cylindrical outer surface and a double contoured inner surface of preselected configuration;
   Step 3: Passing the enlarged end portion of the mandrel through the blank while maintaining the outer walls of the blank free to expand outwardly for forming a generally cylindrical blank opening, moving outer walls of the blank outwardly and forming an outer surface of a preselected configuration in response to passing the mandrel through the blank; and Step 4: Passing the first blank through a second ring die while maintaining the inner walls of the blank free to expand inwardly for forming a generally cylindrical blank outer surface, moving inner walls of the blank inwardly, and forming a second blank having a double contoured blank opening having a diameter progressing outwardly from a middle portion of the second blank toward each end of the second blank in response to passing the first blank through the second ring die.

2. A method, as set forth in claim 1, wherein, at the termination of step 2, the inner surface of the blank opening extends outwardly from a middle portion of the blank toward each end of the blank.

3. A method, as set forth in claim 1, wherein, at the termination of step 3, the outer surface of the blank extends inwardly from a middle portion of the blank toward each end of the blank.

4. A method, as set forth in claim 1, including:
moving a holding means into contact with a second end portion of the blank;
maintaining the first blank during step 3; and
withdrawing the first holdng means from the blank after removal of the mandrel.

5. A method, as set forth in claim 1, including:
contacting the second end of the first blank with an element and pushing the first blank during step 4.

6. A method, as set forth in claim 5, wherein the pushing element is a subsequently formed blank passing from the first ring die.

7. A method, as set forth in claim 6, including:
repeating steps 3 and 4 on said subsequently formed blank.

8. A method, as set forth in claim 1, wherein the metal slug is heated to a preselected temperature.

9. A method, as set forth in claim 1, wherein the metal slug is of a preselected configuration.

10. A method, as set forth in claim 1, including:
contacting a portion of the metal slug with a ledge portion of the mandrel for forming a second end portion of the blank adjacent said second end.

* * * * *

UNITED STATES PATENT AND TRADEMARK OFFICE
CERTIFICATE OF CORRECTION

PATENT NO. : 4,084,423

DATED : April 18, 1978

INVENTOR(S) : Charles H. Schlecht

It is certified that error appears in the above-identified patent and that said Letters Patent are hereby corrected as shown below:

Claim 4 - Column 4, line 4 - after "the", first occurrence, delete "first holdng" and insert ---holding---.

Claim 4 - Column 4, line 4 - after "the", second occurrence, insert ---first---.

Signed and Sealed this

Twenty-ninth Day of May 1979

[SEAL]

Attest:

RUTH C. MASON
Attesting Officer

DONALD W. BANNER
Commissioner of Patents and Trademarks